(12) United States Patent
Van Dorsselaer

(10) Patent No.: US 9,880,836 B2
(45) Date of Patent: Jan. 30, 2018

(54) SYSTEM AND METHOD FOR DEPLOYING A SOFTWARE PROGRAM

(75) Inventor: Rudolf Erik Van Dorsselaer, Lint (BE)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 1959 days.

(21) Appl. No.: 12/912,438

(22) Filed: Oct. 26, 2010

(65) Prior Publication Data
US 2012/0101801 A1  Apr. 26, 2012

(51) Int. Cl.
*G06F 9/44* (2006.01)
*G06F 9/445* (2006.01)

(52) U.S. Cl.
CPC . *G06F 8/71* (2013.01); *G06F 8/61* (2013.01)

(58) Field of Classification Search
CPC ..... G06F 8/61; G06F 8/71; G06F 8/65; G06F 9/4411; G06F 9/44521; G06F 9/44536
USPC .............................. 703/22; 717/172, 177, 174
See application file for complete search history.

(56) References Cited

U.S. PATENT DOCUMENTS

| | | | |
|---|---|---|---|
| 5,581,764 A | 12/1996 | Fitzgerald et al. | |
| 6,292,941 B1* | 9/2001 | Jollands | 717/176 |
| 2002/0062405 A1* | 5/2002 | Ayyagari | 709/331 |
| 2008/0034365 A1* | 2/2008 | Dahlstedt | 718/1 |
| 2008/0059474 A1* | 3/2008 | Lim | 707/9 |
| 2010/0042708 A1* | 2/2010 | Stamler et al. | 709/221 |
| 2011/0010708 A1* | 1/2011 | Lassonde et al. | 718/1 |

* cited by examiner

Primary Examiner — Sujoy Kundu
Assistant Examiner — Lynda Dinh
(74) *Attorney, Agent, or Firm* — Hewlett Packard Enterprise Patent Department

(57) ABSTRACT

A method for deploying a software program on a target computing device includes receiving late-binding configuration actions; combining the late-binding configuration actions with a target computing device-specific model to produce a final configuration model; and providing the final configuration model to the target computing device. The final configuration model is executed by the target computing device to configure the target computing device with the software program.

20 Claims, 3 Drawing Sheets

SYSTEM AND METHOD FOR DEPLOYING A SOFTWARE PROGRAM

BACKGROUND

Computing devices, such as servers, routers, computers, and other devices having processor logic and memory may have an operating system and one or more applications installed thereon. However, the operating systems, and the applications first have to be loaded or deployed onto the computing device. A computing device with no functional operating system may be referred to as a bare metal computing device. A bare metal computing device can have firmware, such as a Basic Input/Output System (BIOS) that functions to identify, test, and initialize system devices such as displays, drives, peripherals, and other hardware. The BIOS sets the hardware into a known state, so that the computing device can be configured with the operating systems and applications.

Different approaches exist for configuring a computing device. Desired-state software management models may be used to configure various computing devices such as computers and servers with operating systems and applications. The desired-state management model usually is built well before deployment of an operating system to a computer system, and may be based on a set of software developer-selected use cases. A task-based configuration approach uses a series of discrete steps to at least partly configure a computing device. Because the desired-state model typically is developed well before deployment of operating systems and applications, it may conflict with a task-based approach where late-binding, ad hoc configuration decisions are common.

DESCRIPTION OF THE DRAWINGS

The detailed description will refer to the following figures in which like numerals refer to like items, and in which.

DETAILED DESCRIPTION

Figure 1:
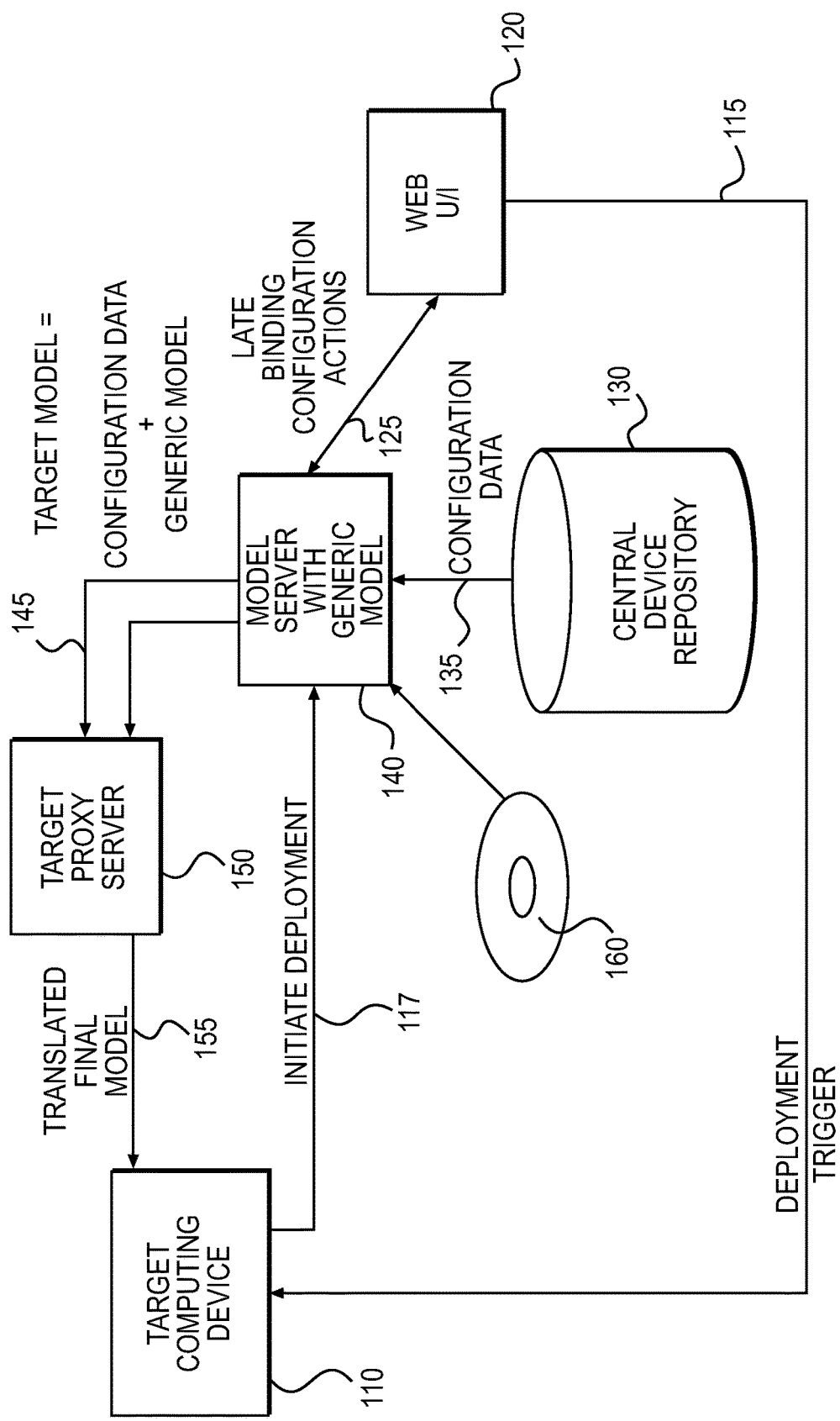
FIG. 1 illustrates an example of a software program deployment system.

One approach for configuring a computer is to use a generic desired-state model for a computer's software (i.e., operating systems and applications) configuration. The generic desired-state model is developed from a set of software developer-selected uses-cases by specifying configuration actions (e.g., deploy operating system ABC with options 1, 2, and 5; deploy operating system XYZ with options 2 and 3). The generic desired-state model typically is developed well before deployment of the operating systems and applications on the computer. The deployment of the operating systems and applications then proceeds according to the software developer-specified use-cases. However, the generic desired-state model, being generic, may not account for variations between a target computer and the device upon which the generic desired-state model is based. That is, the generic desire-state model may not reflect the actual state of the target computer at the time of software deployment.

In a task-based configuration processes, a computer user or system administrator specifies the steps to use for configuring the computer hardware and the software programs to be deployed thereon. This approach can account for a current state of the target computer.

Both task-based and desired-state models may be used to configure various target computing devices such as computers and servers. However, because the generic desired-state model is built "up front," it may not harmonize with a task-based approach where late-binding, ad hoc configuration decisions are common. Furthermore, the generic desired-state model works by object classification based on pre-determined use-cases; any object not classified by the generic desired-state model can be assigned by the model to a default handler that is part of the target computing device's BIOS or functional operating system. Thus, for physical objects such as software programs or files, failure of the generic desired-state model to classify the software programs or files does not present a problem because of the default handler assignment. However, how the objects should be deployed (i.e., the configuration actions related to the software programs), if not accounted for (correctly or at all) in the generic desired-state model, can present a problem at the time of software deployment. Furthermore, lack of, or improper, classification for the configuration actions as opposed to physical objects such as software programs is more likely to occur in the generic desired-state model because configuration actions are more dynamic in nature software programs and thus more difficult to model in advance of the software deployment. Moreover, some configuration action decisions are made at the time of software program deployment, and thus cannot be included in the generic desired-state model.

To overcome problems inherent in current methods for deploying a software program (i.e., the configuration of operating systems and applications on a computer), the herein disclosed software program deployment system, and corresponding method, overlay task-specific actions on top of a generic desired-state model. Specifically, an operating system to be deployed and installed on a target computing device has a set of pre-defined configuration actions in the generic desired-state model. To provide a computer system administrator with some flexibility in the operating system deployment, the generic desired-state model is modified by the use of a task-based add-on that allows the addition or substitution of administrator-defined configuration actions to the generic desired-state model. Thus, the system administrator can add a new configuration action to the desired-state model, can substitute a new configuration action for a pre-defined configuration action in the generic desired-state model, and can deleted a pre-defined configuration action from the generic desired-state model. As an example, a generic desired-state model may not provide for hard drive partitioning. Upon deployment of an operating system, however, the system administrator may desire to partition the hard drive, and can, using the herein disclosed system and method, add this configuration action to the generic desired-state model that was previously developed for deployment and installation of the operating system.

FIG. 1 illustrates an example of a software program deployment system. The software deployment system of FIG. 1 supports combining task-based configuration actions with a generic desired-state model. The system may be used to deploy an operating system to a bare metal computing device, deploy applications to a computing device already configured with a fully functional operating system, and deploy a new operating system to replace an existing operating system, or to act as a second or subsequent operating system on the computing device. For simplification of description, the system and corresponding method will be disclosed with respect to deploying and installing an operating system on a bare metal computing device.

In FIG. 1, system 100 includes bare metal target computing device 110, which is to have an operating system installed thereon. The target computing device 110 may be any software-configurable computing system, such as a server, for example. A computer system administrator employs a Web-based user interface (U/I) 120 to initiate, control, and manage configuration of the target computing device 110 and deployment and installation of the operating system. Also shown in FIG. 1 is model server 140, central device repository 130, and target proxy server 150. The servers 140 and 150 may be separate hardware devices or may be virtual machines. Alternately, the servers 140 and 150 may be combined on one hardware device. The central device repository 130 maintains configuration data for the target computing device 110. The configuration data may specify, for example, that the target computing device 110 includes a single hard drive, that specific permission is required from a system administrator to deploy the operating system to the target computing device 110, etc. The central device repository 130 also maintains configuration data for other devices that may be configured using the system 100. Finally, the central device repository 130 may maintain the to-be-installed operating system programming, files, and data. The model server 140 maintains a generic desired-state model for configuring the target computing device 110. In an embodiment, the generic desired-state model may require the addition of target device-specific configuration data 135, which, as noted above, is maintained in the repository 130. The model server 140 receives from the Web U/I 120, any late-binding configuration actions 125 specified by the system administrator. To construct a final configuration model specific to the target computing device 110, the model server 140 retrieves the target computing device-specific configuration data 135 from the repository 130 and passes the device-specific configuration data 135 and generic desired-state model (i.e., target computing device-specific configuration model 145) to the target proxy server 150 along with the late-binding configuration actions 125. The target proxy server 150 overlays the administrator-selected late-binding configuration actions 125 on the model 145 to form a final configuration model, which the target computing device 110 will receive to drive configuration and installation of the operating system on the target computing device 110. That is, the target proxy server 150 combines (deletes, adds, or substitutes) configuration actions defined or selected by the computer system administrator with the model 145 to achieve a final configuration action set, or model, to use in deploying the operating system on the target computing device 110. To achieve the final configuration model, the target proxy server 150 translates the combined late-binding configuration actions 125 and model 145 into a format appropriate for the target computing device 110. For example, the combined late-binding configuration actions 125 and model 145 is translated into an XML-formatted document or file. Final configuration model 155 contains the model description for the intended deployment (e.g., what operating system to deploy and install, files required for the operating system deployment and installation, how to configure the target computing device hard disk) as well as all the configuration data needed so that the BIOS on the target computing device 140 can perform the operating system installation.

The Web U/I 120 may be generated by the model server 140, and the programming that provides for the Web U/I may be stored in memory in the model server 140 and executed by a processor in the model server 140. The Web U/I 120 exposes the operating system deployment to the computer system administrator as a task that the administrator can control. The computer system administrator uses the Web U/I 120 to initiate the deployment process of the target computing device 110 by sending deployment trigger 115 to the target computing device 110. The deployment trigger 115 may be a simple command. The target computing device 110 receives the deployment trigger 115, and in response, sends an initiate deployment request 117 to the model server 140. The Web U/I 120 displays to the administrator prompts, menus, and directions regarding selection of configuration actions, and provides the administrator with a running status of the operating system deployment on the target computing device 110.

Finally, the system 100 may include computer readable medium 160. Computer readable medium 160 may be an optical disk, for example, and may have loaded thereon, the applications, programs, files, and data used by the servers 140 and 150 to execute a process for configuring the target computing device 110. The applications, programs, files and data may be transferred from the computer readable medium 160 to another computer readable medium such as the central device repository 130, or persistent memory (not shown) on the model server 140. Within the model server 140, the applications, programs, files and data may be stored in volatile memory (not shown), and executable code within the applications and programs may be executed by a processor of the model server 140. Similarly, a processor (not shown) on the target proxy server 150 may execute appropriate code to form the final configuration model, and a processor (not shown) on the target computing device 110 may execute the final configuration model to configure the target device 110 with the desired operating system and/or applications.

Figure 2:
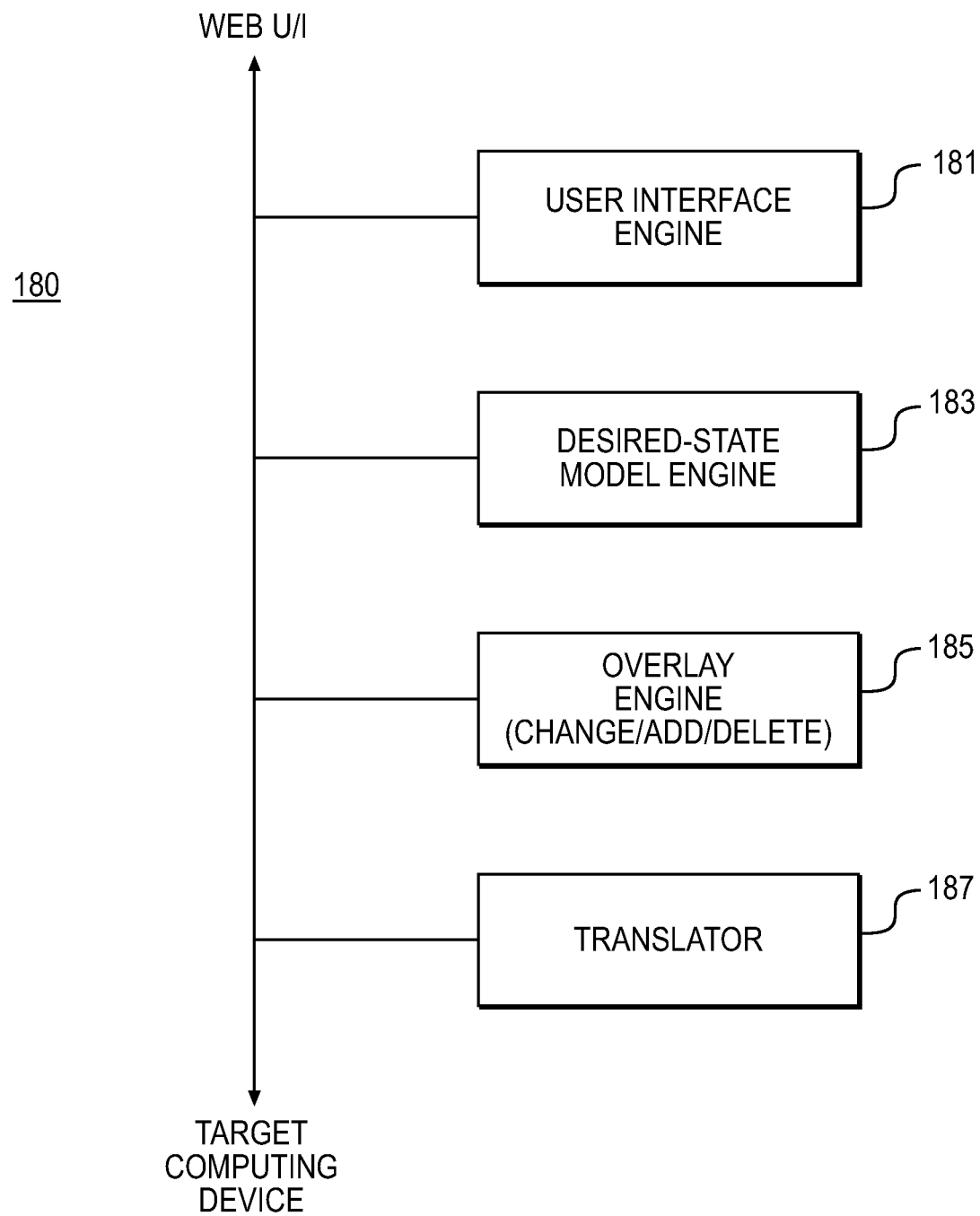
FIG. 2 illustrates additional details of the system of FIG. 1.

FIG. 2 illustrates additional details of the system 100 of FIG. 1. Specifically, FIG. 2 illustrates some of the programming elements 180 of the system 100. In FIG. 2, the programming elements 180 include user interface engine 181, desired-state model engine 183, overlay engine 185, and translator 187. The interface engine 181 includes the programming that produces the various displays, menus and windows provided to the computer system administrator at the Web U/I 120 and receives administrator selections, including the late-binding configuration action selections 125. The desired state model engine 183 includes the programming that selects the generic desired-state model, and adds the appropriate target computing device data 130 to that model. The overlay engine 185 adds the late-binding configuration actions to the model. Finally, the translator 187 translates the model into a format or language appropriate to the target computing device 110 to produce the translated final configuration model 155.

The programming elements 180 shown in FIG. 2 may be installed on the servers 140 and 150 as appropriate. Alternately, the servers 140 and 150 may be combined into one server, and the programming elements 180 installed on this single server. The programming elements 180 may be stored in persistent memory such as the central device repository 130; the programming elements 180 may be maintained in memory in the servers 140 and 150, and the executable code of the programming elements 180 may be executed by processors on the servers 140 and 150.

Figure 3:
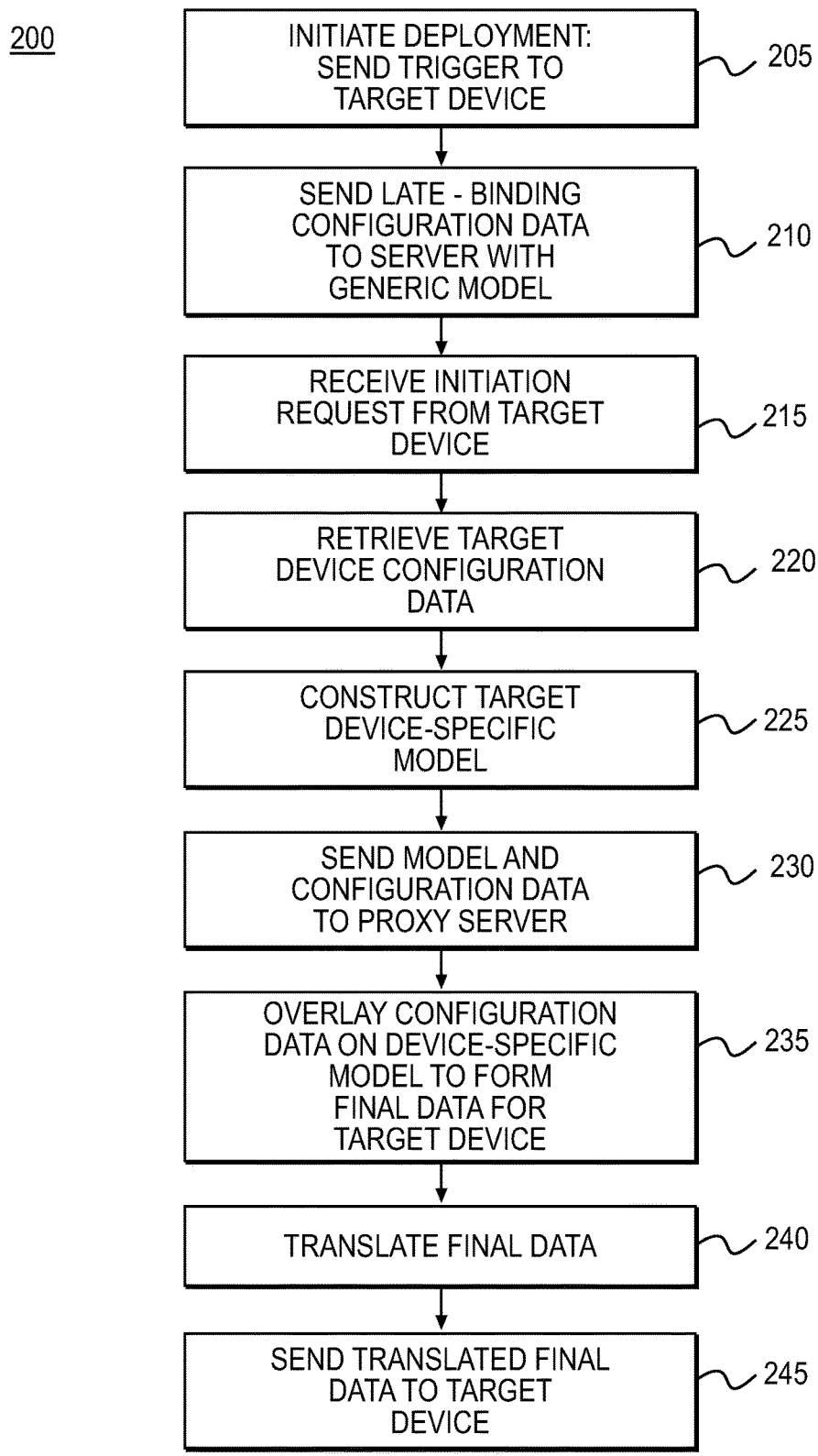
FIG. 3 is a flowchart of an example operation executed by the system of FIG. 1.

FIG. 3 is a flowchart illustrating an example configuration control operation 200 executed on the system 100 of FIG. 1. In FIG. 3, operation 200 begins with block 205 when the system administrator, using Web U/I 120 initiates deployment of an operating system on target device 110 by sending a deployment trigger 115 to the target device 110. The actual operating system programming may be provided with the trigger 115. A processor at the target computing device 110 reads the trigger 115. In block 210, the computer system administrator, using the Web U/I 120, provides, and the model server 140 receives, late-binding configuration actions 125, which ultimately will be combined with the generic desired-state model to produce a final configuration model 155 by which the target device 110 is configured with the operating system. In block 215, the model server receives an initiate deployment request 117.

In block 220, the model server 140, in response to the request 117, retrieves target computing device-specific configuration data 135, as necessary, from central device repository 130. In block 225, the model server 140, using the configuration data 135, as required, constructs a target computing device-specific model 145 for the target computing device 110. The target device-specific model 145 reflects the generic desired-state model as it applies to the target computing device 110. Note, however, that the generic desired-state model may not require modification with the configuration data 135.

In block 230, the model server 140 sends the target computing device-specific model 145 (that is, the generic desired state model and any target computing device-specific configuration data 135) to target proxy server 150. In block 235, the target proxy server 150, using the late-binding data 125 and the target computing device-specific model 145, generates a final version of the generic desired-state model that overlays the late-binding data 125 on the model 145. This overlay process executed on the server 150 includes changing configuration actions, inserting new configuration actions, and deleting, without replacement, existing configuration actions. In block 240, the target proxy server 150 translates the final configuration model into a form or language readable by the target device 110. For example, the final configuration model is translated into an XML-formatted document or file. Finally, in block 245, the target proxy server 150 sends the translated final configuration model 155 to the target device 110, where it is used by the target computing device's BIOS to install the operating system.

What is claimed is:

1. A non-transitory computer readable medium including programming for execution by a processor, the programming, when executed by the processor, implementing a method for deploying a software program on a target computing device, comprising:
   receiving, by a model server, late-binding configuration actions and configuration data specific to the target computing device, wherein the late-binding configuration actions are received from a user interface;
   constructing, by the model server, a first model specific to the target computing device using a generic desired-state model and the configuration data specific to the target computing device;
   providing, by the model server, the first model specific to the target computing device and the late-binding configuration actions to a target proxy server;
   combining, by the target proxy server, the late-binding configuration actions with the first model specific to the target computing device to produce a final configuration model; and
   providing, by a target proxy server, the final configuration model to the target computing device, wherein the final configuration model is executed by the target computing device to configure the target computing device with the software program.

2. The non-transitory computer readable medium of claim 1, wherein the generic desired-state model comprises a first set of configuration actions.

3. The non-transitory computer readable medium of claim 2, wherein the final configuration model comprises both the first set of configuration actions and at least one of the late-binding configuration actions.

4. The non-transitory computer readable medium of claim 1, wherein the late-binding configuration actions are entered in the user interface by an administrator of the target computing device.

5. The non-transitory computer readable medium of claim 1, wherein the method further comprises sending to the target computing device, a deployment trigger provided through the user interface.

6. The non-transitory computer readable medium of claim 1, wherein the method further comprises translating the final configuration model into a language of the target computing device.

7. The non-transitory computer readable medium of claim 1, wherein the software program is an operating system.

8. The non-transitory computer readable medium of claim 7, wherein the target computing device is a bare metal computing device without a functional operating system.

9. The non-transitory computer readable medium of claim 7, wherein the target computing device comprises a functional operating system, and wherein the operating system overwrites the functional operating system.

10. A system for configuring a target computing device with a software program, comprising:
    a user interface to receive late-binding configuration actions;
    a model server to:
      receive the late-binding configuration actions and a request to initiate deployment of the software program to the target computing device, and
      construct a target computing device-specific model using a generic desired-state model and configuration data specific to the target computing device; and
    a target proxy server, coupled to the model server, to construct, using the target computing device-specific model and the late-binding configuration actions, a final configuration model to control deployment of the software program on the target computing device.

11. The system of claim 10, wherein the user interface is coupled to the model server, wherein the late-binding configuration actions are entered in the user interface by an administrator of the target computing device.

12. The system of claim 10, wherein the generic desired-state model comprises a first set of configuration actions.

13. The system of claim 12, wherein the target proxy constructs the final configuration model to include both the first set of configuration actions and at least one of the late-binding configuration actions.

14. The system of claim 10, wherein the target proxy server translates the final configuration model into a language of the target computing device.

15. A method for deploying a software program on a target computing device, comprising:
    receiving, by a model server, late-binding configuration actions and configuration data specific to the target computing device, wherein the late-binding configuration actions are received from a user interface;

constructing, by the model server, a first model specific to the target computing device using a generic desired-state model and the configuration data specific to the target computing device;

providing, by the model server, the first model specific to the target computing device and the late-binding configuration actions to a target proxy server;

combining, by the target proxy server, the late-binding configuration actions with the first model specific to the target computing device to produce a final configuration model; and providing, by a target proxy server, the final configuration model to the target computing device, wherein the final configuration model is executed by the target computing device to configure the target computing device with the software program.

16. The method of claim 15, wherein the generic desired-state model comprises a first set of configuration actions.

17. The method of claim 15, wherein the late-binding configuration actions are entered in the user interface by an administrator of the target computing device.

18. The method of claim 17, further comprising sending, to the target computing device, a deployment trigger provided through the user interface.

19. The method of claim 16, wherein the final configuration model comprises one or more of the first set of configuration actions and at least one of the late-binding configuration actions.

20. The method of claim 15, further comprising translating the final configuration model into a language of the target computing device.

* * * * *